(12) United States Patent
Xu et al.

(10) Patent No.: US 8,761,268 B2
(45) Date of Patent: Jun. 24, 2014

(54) SELECTIVE LOCAL ADAPTIVE WIENER FILTER FOR VIDEO CODING AND DECODING

(75) Inventors: Lidong Xu, Beijing (CN); Yi-Jen Chiu, San Jose, CA (US); Wenhao Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 561 days.

(21) Appl. No.: 12/418,804

(22) Filed: Apr. 6, 2009

(65) Prior Publication Data

US 2010/0254448 A1    Oct. 7, 2010

(51) Int. Cl.
*H04N 7/68* (2006.01)
*H04N 7/12* (2006.01)
*H04N 7/035* (2006.01)
*H04N 7/26* (2006.01)
*H04N 7/025* (2006.01)

(52) U.S. Cl.
CPC ... *H04N 19/00551* (2013.01); *H04N 19/00545* (2013.01); *H04N 7/26058* (2013.01); *H04N 19/00951* (2013.01); *H04N 19/00969* (2013.01); *H04N 19/00884* (2013.01); *H04N 19/00212* (2013.01); *H04N 19/00909* (2013.01)
USPC ............ 375/240.29; 375/240; 375/240.01; 375/240.23; 375/240.27

(58) Field of Classification Search
CPC .......... H04N 7/26058; H04N 7/26425; H04N 7/26377; H04N 7/26382; H04N 7/26888; H04N 19/00018; H04N 19/00072; H04N 19/00175; H04N 19/00212; H04N 19/00278; H04N 19/00545; H04N 19/00551; H04N 19/00066; H04N 19/00884; H04N 19/0089; H04N 19/00909; H04N 19/00969; H04N 21/23418; G06T 9/40
USPC ................... 375/240, 240.01, 240.27, 240.23
See application file for complete search history.

(56) References Cited

U.S. PATENT DOCUMENTS

| | | | | |
|---|---|---|---|---|
| 5,452,104 A | * | 9/1995 | Lee | 358/426.14 |
| 5,844,613 A | * | 12/1998 | Chaddha | 375/240.12 |
| 2002/0191695 A1 | * | 12/2002 | Irvine et al. | 375/240.03 |
| 2003/0026335 A1 | * | 2/2003 | Thyagarajan | 375/240.2 |
| 2004/0179593 A1 | * | 9/2004 | Goldstein et al. | 375/240.01 |
| 2006/0029134 A1 | * | 2/2006 | Winder et al. | 375/240.12 |

(Continued)

OTHER PUBLICATIONS

M. Jiang & N. Ling, "On Enhancing H.264/AVC Video Rate Control by PSNR-Based Frame Complexity Estimation", 51 IEEE Trans. on Consumer Electronics 281-286 (Feb. 2005).*

(Continued)

*Primary Examiner* — Dave Czekaj
*Assistant Examiner* — David N Werner
(74) *Attorney, Agent, or Firm* — Trop, Pruner & Hu, P.C.

(57) ABSTRACT

An adaptive Wiener filter may be applied to improve coding efficiency because of information lost during quantization of the video encoding process. The Wiener filter may be selectively applied globally to an entire picture or locally to portions of the picture. Histogram segmentation may be used to select pixels for Wiener filtering in some embodiments. The Wiener filter may be adaptively applied to histogram bins, improving coding efficiency in some cases.

14 Claims, 4 Drawing Sheets

(56) References Cited

U.S. PATENT DOCUMENTS

| | | | |
|---|---|---|---|
| 2006/0039472 A1* | 2/2006 | Barbarien et al. | 375/240.16 |
| 2006/0176962 A1* | 8/2006 | Arimura et al. | 375/240.24 |
| 2008/0192821 A1* | 8/2008 | Malayath et al. | 375/240.03 |
| 2008/0274674 A1* | 11/2008 | Prasad et al. | 451/60 |
| 2009/0022220 A1* | 1/2009 | Vatis et al. | 375/240.12 |
| 2009/0154567 A1* | 6/2009 | Lei et al. | 375/240.24 |
| 2010/0008417 A1* | 1/2010 | Xu et al. | 375/240.02 |

OTHER PUBLICATIONS

T. Wiegand, M. Flierl, & B. Girod, "Entropy-Constrained Design of Quadtree Video Coding Schemes", presented at the 6th Int'l Conf. on Image Processing and its Applications (Jul. 1997).*

Xu et al., "Video Encoding Techniques", U.S. Appl. No. 12/217,805, filed Jul. 9, 2008.

Chiu et al., "In-Loop Adaptive Wiener Filter for Video Coding and Decoding", U.S. Appl. No. 12/082,182, filed Apr. 9, 2008.

* cited by examiner

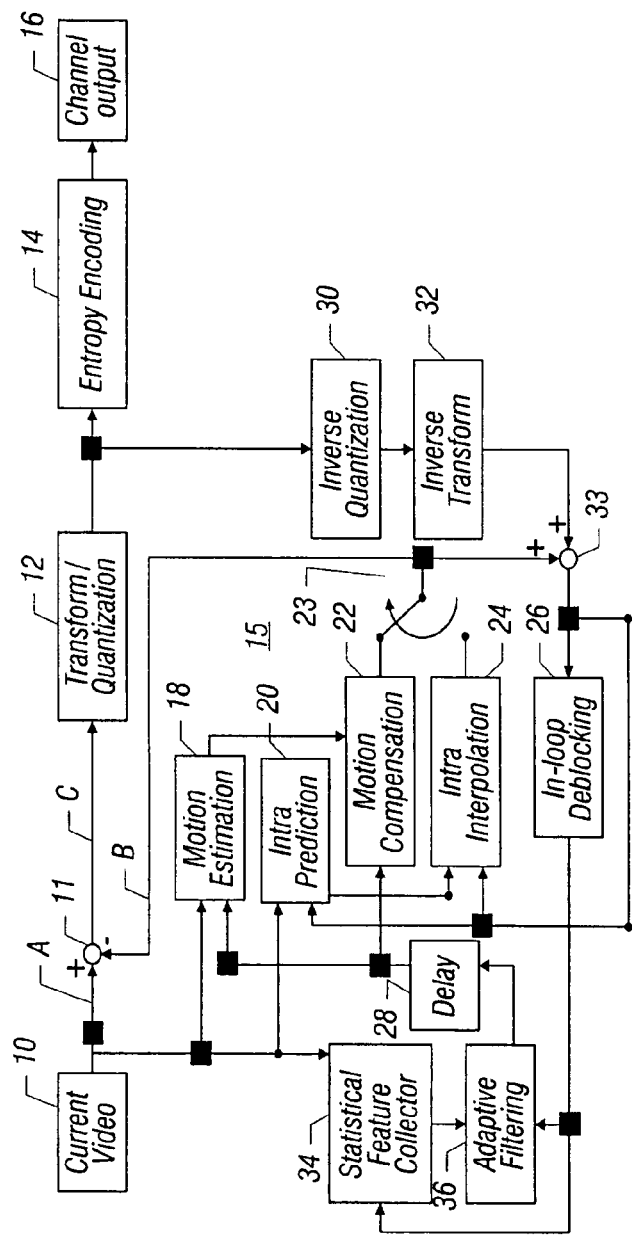
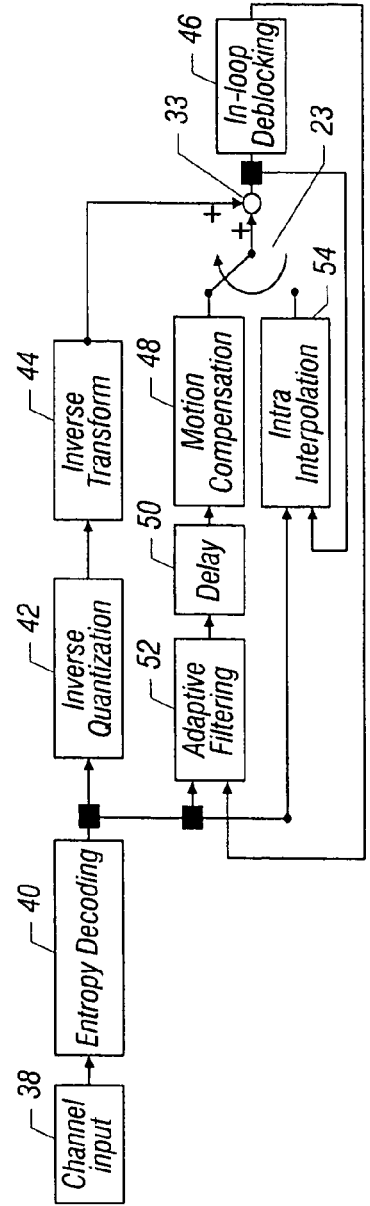
FIG. 1
FIG. 2

SELECTIVE LOCAL ADAPTIVE WIENER FILTER FOR VIDEO CODING AND DECODING

BACKGROUND

This relates generally to codecs or video encoders and decoders.

A video encoder compresses video information so that more information can be sent over a given bandwidth. The compressed signal may then be transmitted to a receiver that decodes or decompresses the signal prior to display.

Conventional video encoding algorithms result in losses. That is, in the course of compressing the video information, some information may be lost, resulting in decreased picture quality. Ideally, the video quality is improved to the greatest possible extent and the compression is increased to the greatest possible extent. However, these two goals tend to conflict with one another.

BRIEF DESCRIPTION OF THE DRAWINGS

FIG. 1 is a schematic depiction of an encoder according to one embodiment;

FIG. 2 is a schematic depiction of a decoder for use in connection with the encoder shown in FIG. 1 in accordance with one embodiment;

DETAILED DESCRIPTION

Figure 3:
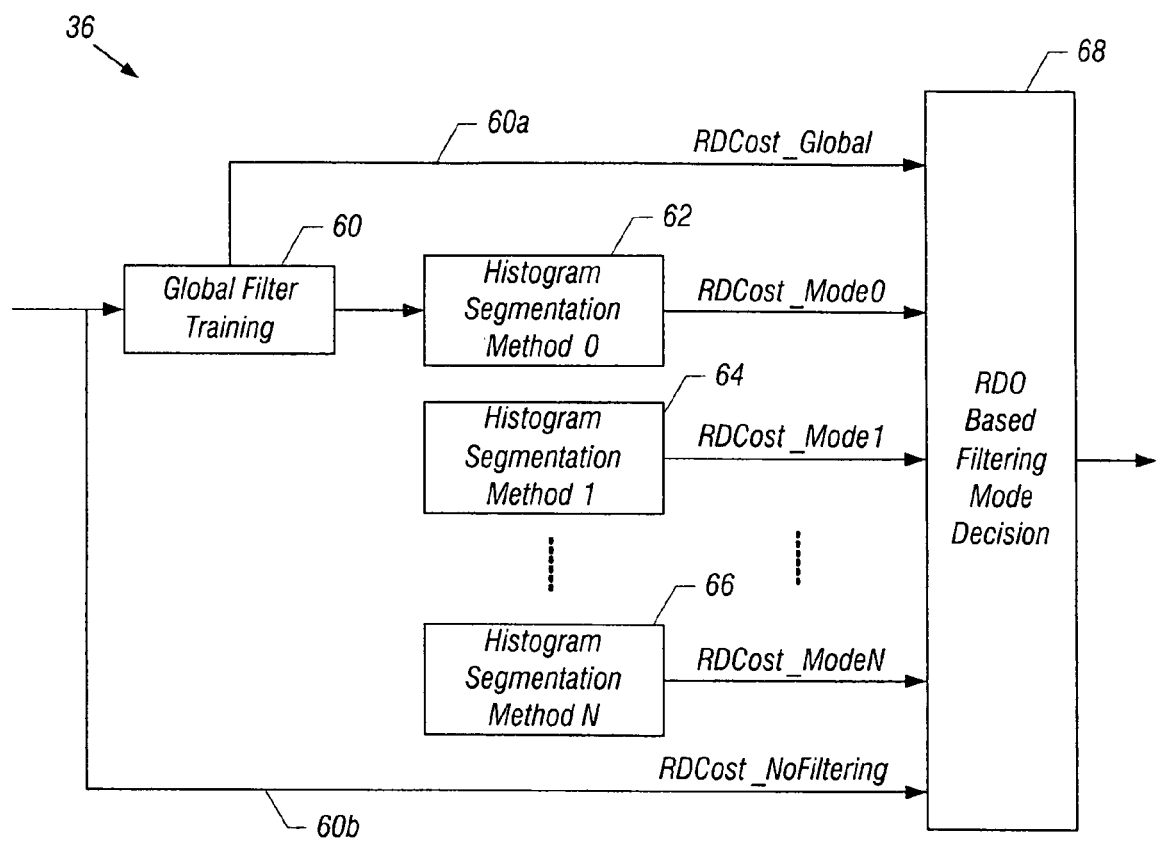
FIG. 3 is a depiction of a Weiner filter for use as the adaptive filtering in the embodiment of FIG. 1.

To improve the coding efficiency with respect to the information lost during the quantization phase of transform coefficients of video encoding process, an adaptive (Wiener) filter may be applied as an out-loop video processing tool or as part of in-loop modules in the core video coding pipeline to improve the compression gain and the reconstructed video frame quality. Because a global Wiener filter may lose adaptation to some local pixel information, the Wiener filter may be applied locally, to adaptively selected pixels of a frame. Histogram segmentation may help select pixels for filtering in one embodiment. By applying a Wiener filter adaptively on histogram bins, superior coding efficiency may be obtained in some embodiments.

Referring to FIG. 1, the current video information may be provided from a current video block 10 in a form of a plurality of pictures or frames. The current video is passed to a differencing unit 11. The differencing unit 11 is part of the Differential Pulse Code Modulation (DPCM) (also called the core video encoding) loop 15, which includes a motion compensation stage 22 and a motion estimation stage 18. The loop 15 may also include an intra prediction stage 20, intra interpolation stage 24, and delay line 28. In some cases, an in-loop de-blocking filter 26 may also be used in the loop 15.

The current video is provided to the differencing unit 11 and to the motion estimation stage 18. The motion compensation stage 22 or the intra interpolation stage 24 produce an output at B through a switch 23 that is then subtracted from the current video 10 at A to produce a residual at C. The residual is then transformed and quantized at block 12 and subjected to entropy encoding in block 14. A channel output results at block 16.

The output of motion compensation or intra-interpolation is also provided to a summer 33 that receives an input from inverse quantization unit 30 and inverse transform unit 32 (that undo the transformation and quantization of the unit 12). The inverse transform unit 32 provides dequantized and detransformed information back to the loop 15.

"Coding efficiency" is an indication of the extent to which the DPCM loop 15 is effective in reducing the residual or difference between the prediction picture B from the loop and the current picture A. Coding efficiency affects ultimate picture quality.

The encoder of FIG. 1 may be consistent with the H.264 (advanced video codec (AVC) and MPEG-4 Part 10), compression standard, for example. The H.264 standard has been prepared by the Joint Video Team (JVT), which includes ITU-T SG16 Q.6, also known as VCEG (Video Coding Expert Group), and of the ISO-IEC JTC1/SC29/WG11 (2003), known as MPEG (Motion Picture Expert Group). H.264 is designed for applications in the area of digital TV broadcast, direct broadcast satellite video, digital subscriber line video, interactive storage media, multimedia messaging, digital terrestrial TV broadcast, and remote video surveillance, to mention a few examples.

While one embodiment may be consistent with H.264 video coding, the present invention is not so limited. Instead, embodiments may be used in a variety of video compression systems including MPEG-2 (ISO/IEC 13818-1 (2000) MPEG-2 available from International Organization for Standardization, Geneva, Switzerland) and VC1 (SMPTE 421M (2006) available from SMPTE White Plains, N.Y. 10601).

A block-based coding may utilize transform and quantization unit 12, motion estimation unit 18, and entropy encoding unit 14 on the residue C of the motion compensated or intra interpolated block. A macro block may include 16×16 luma pixels. A macro block can be further partitioned into smaller 16×8, 8×16, and 8×8 blocks. Each 8×8 block, called a sub-macro block, can be further divided into smaller 8×4, 4×8, and 4×4 blocks.

H.264 allows users to use the motion compensation prediction from the reference pictures in two reference lists that consist of multiple pictures. The quantization unit 12 performs a lossy process to compress the data rate to meet the bandwidth requirements of application at the cost of picture quality. The information loss during the quantization process is unrecoverable and, thus, coding artifacts are observed, such as blocking noise. An in-loop de-blocking filter 26 may smooth the picture part of motion estimation and motion compensation in some embodiments.

In-loop local applied adaptive filtering 36 may be achieved by a Wiener filter. A Wiener filter is a filter that achieves the least mean square error among the source signal and the predicted signal modeled through the random noise. "In-loop", with respect to an encoder, means any module, stage or unit of a differential pulse code modulation loop whose output is fed back to the differencing unit. The corresponding parts of a decoder to decode the results of in-loop decoding are also "in-loop". "Adaptive filtering" means that filtering is content dependent or based on an analysis of pixel intensities in a portion of a picture, a picture as a whole, or a plurality of successive pictures. "Locally applied" means that the filter is applied selectively to a portion of the picture. For example, the type of video information that is received, be it graphics or stream view video, results in different taps in the Wiener filter for different types of video. Thus, adaptive filter taps are the result of an examination of the intensity of each pixel in a given picture portion, picture, or series of pictures.

The adaptive filtering 36 may receive an input from a statistical feature collector 34 and, in one embodiment, from the de-blocking filter 26. Its output is provided via a delay unit 28 to both the motion compensation unit 22 and the motion estimation unit 18 in one embodiment. Thus, the adaptive filtering 36 is applied to the input of the motion estimation and motion compensation stages 18 and 22.

The statistical feature collector 34 receives an input from the de-blocking filter 26, in one embodiment, and receives the current video on the line A. The statistical feature collector 34 calculates the weight. $c_i$, which is applied to a reconstructed mapped pixel $y_i$. The weight $c_i$ is used to calculate the filter taps for a Wiener filter that does the adaptive filtering 36. The statistical feature collector 34 analyzes each pixel of a picture and determines how groups of pixels across a region of a picture or across multiple pictures vary in intensity to determine what type of video is being received and what adaptive filtering should be done. Based on this information, it sets the filter taps for the Wiener filter in the adaptive filtering unit 36 to reduce the resulting residual at C.

Referring next to FIG. 2, a decoder for the encoder of FIG. 1 includes a channel input 38 coupled to an entropy decoding unit 40. The output from the decoding unit 40 is provided to an inverse quantization unit 42 and an inverse transform unit 44 and to an adaptive filtering unit 52. The adaptive filtering unit 52 is coupled to a delay 50 and to a motion compensation unit 48. The output of the entropy decoding unit 40 is also provided to an intra interpolation unit 54, which feeds a selector switch 23. The information from the inverse transform unit 44 and the motion compensation unit 48, or the intra interpolation unit 54, as selected by the switch 23, are then summed and provided to an in-loop de-blocking unit 46. The output of the in-loop de-blocking unit 46 is then fed back to the adaptive filtering 52. The adaptive filtering 52 may also use a Wiener filter.

The output from the encoding operation may include a frame that has a header that indicates information about the filter taps used by the encoder's adaptive filtering. That header information is then used to set the appropriate filter taps in the adaptive filtering 52.

In video encoder, adaptive Wiener filtering aims to minimize the differences between two pictures or two picture regions from the input picture and from the reconstructed picture. The filter coefficients may be transmitted to decoder. Let $Q_{x,y}$ be the input of video encoder, and $P_{x,y}$ be the reconstructed pixel. In bit-depth scalability, $Q_{x,y}$ is the high layer input and $P_{x,y}$ is the tone-mapped pixel of low layer reconstruction. Adaptive Wiener filtering is performed on $P_{x,y}$ according to equation (1) below to get the output pixel $P'_{x,y}$. The coefficients $C_{i,j}$ of the M×N two dimensional (2-D) adaptive Wiener filter are obtained by minimizing the distortion between $Q_{x,y}$ and $P'_{x,y}$. If M or N is set to 1, it is a one dimensional (1-D) Wiener filter.

$$P'_{x,y} = \sum_{j=0}^{M-1}\sum_{i=0}^{N-1} P_{x',y'} C_{i,j} \qquad (1)$$

The coefficients $C_{i,j}$ are side information coded into channel output 16 bitstreams for subsequent decoding. Transmission of that side information may degrade the compression performance of the whole video encoding. A rate-distortion-optimization (RDO) (i.e. optimizing the amount of distortion against the amount of data needed to encode a signal) criterion may be used to determine if the picture or picture region should be filtered or not. Let $D(P,Q)$ be the distortion between the original pixels $Q_{x,y}$ and the unfiltered reconstructed pixels $P_{x,y}$, $D(P',Q)$ be the distortion between the original pixels $Q_{x,y}$ and the filtered reconstructed pixels $P'_{x,y}$ and R be the number of bits (rate) for coding the side information, the picture or picture region will be filtered if the following condition for RD cost J is satisfied, where, $\lambda$ is the Lagrangian factor:

$$D(P,Q) > (J = D(P',Q) + \lambda R) \qquad (2)$$

When filtering a picture with a global (i.e. entire picture at a time) Wiener filter, the filter coefficients are trained with all the pixels in the picture. In this case, the filtering reduces the distortions of some pixels, but increases the distortions of other pixels. So, more coding gain may be achieved by only performing the Wiener filtering on part of the pixels in the picture. One method is to categorize pixels into groups with histogram segmentation and then perform Wiener filtering adaptively (depending on RDO criterion) on each histogram bin. Suppose that the histogram is divided into N bins (with any kind of partition method, uniform or non-uniform). For each bin $B_i$, we can get two distortions. One is unfiltered pixel distortion $D_{0i}$ and the other is filtered pixel distortion $D_{1i}$. The final distortion $D_i$ and filtering flag $f_i$ of this bin $B_i$ are as follows:

$$\begin{cases} D_i = D_{0i} > D_{1i}\,?\,D_{1i}:D_{0i} \\ f_i = D_{0i} > D_{1i}\,?\,1:0 \end{cases} \qquad (3)$$

Then the RD cost J of the histogram segmentation based filtering is defined according to equation (4) below. Here the rate R is the number of bits for not only the filter coefficient C, but also the bin filtering flag f:

$$J = \sum_{i=1}^{N} D_i + \lambda R(C, f) \qquad (4)$$

With multiple histogram partition methods, in one embodiment, the one with the minimum RD cost may be used for Wiener filtering if its RD cost satisfies the condition in equation (2).

In a histogram segmentation based filtering method, the filter coefficients may be refined by re-training them with only the bins whose filtering flags equal to 1. After obtaining the new filter coefficients, the filtering flag of each bin is reset and then the new RD cost is calculated using equation (4). The re-training process can be iterated until the maximum iteration time is reached. Then, the filter coefficients and the bin filtering flags obtained in the last iteration may be used for the filtering process of the specified histogram segmentation method. This filter is called main filter, and corresponds to the complementary filter introduced in the following section.

In a histogram segmentation based filtering method, a new Wiener filter may be trained with-the bins whose filtering flags equal to 0. This new filter is called a complementary filter which aims to improve the quality of the pixels (bins) that are not filtered by the main filter. The complementary filter coefficients are also side information that may be transmitted to decoder. So the RD cost condition in equation (2) may also be used to determine which bins should be filtered by the complementary filter. If the complementary filter is not used to filter the bins, it is not necessary to transmit the filter coefficients to decoder.

With histogram segmentation based filtering, the filtering flag of each histogram bin may be transmitted to the decoder. The filtering flags may be a binary string which can be written into the video bitsteam directly or may be encoded with any kind of entropy coding method, e.g., run-length coding, quad-tree coding, arithmetic coding and etc., before being written into video bitsteam. The video encoding can use only one of the entropy coding modes for coding the filtering flags, or it may try multiple entropy coding modes and select the best one to code the filtering flags. In the later scheme, the adopted entropy coding mode may be signaled in the video bitstream for decoding.

The Wiener filter coefficients produced by the histogram segmentation are then used by the decoder.

Figure 4:
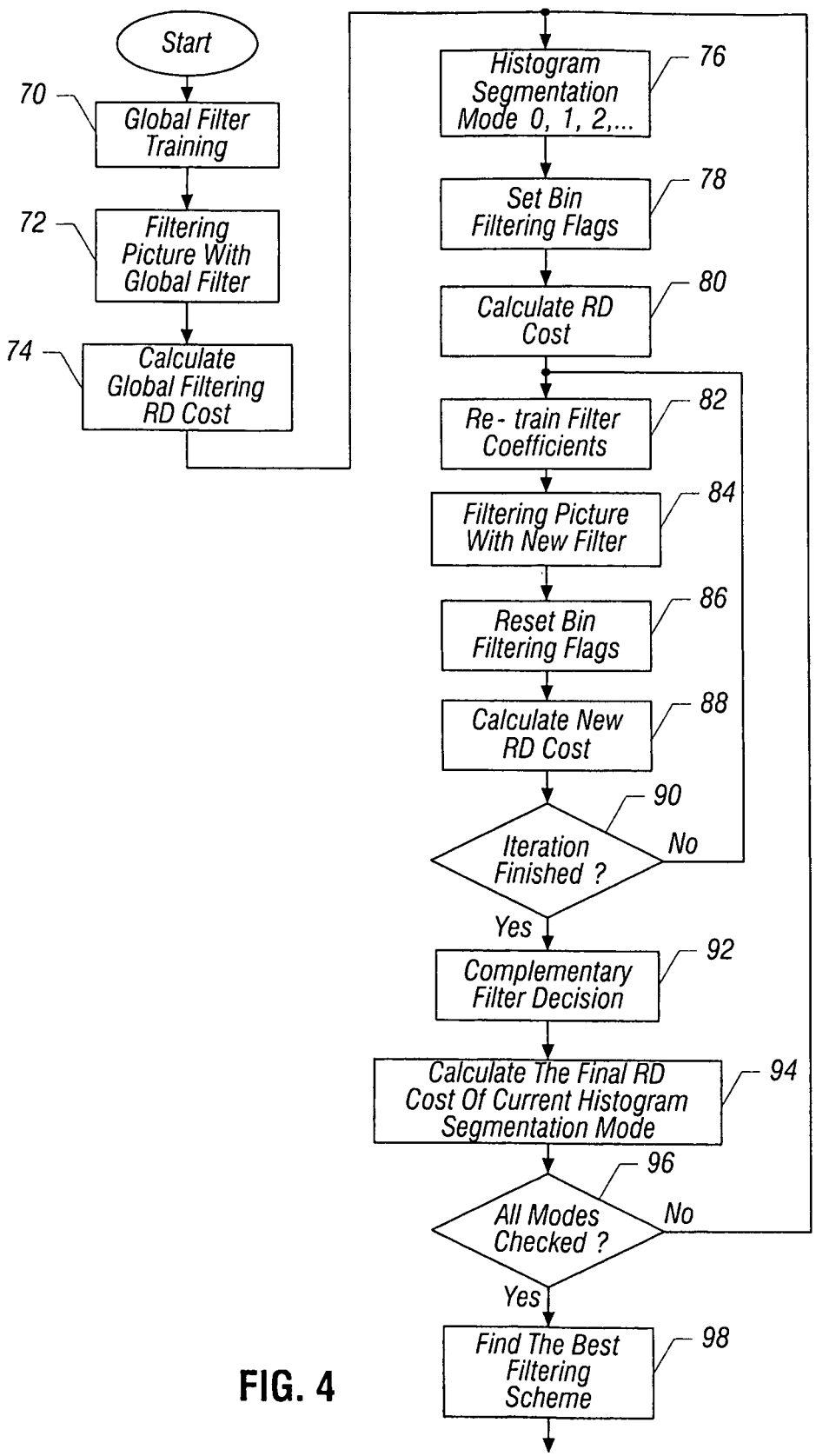
FIG. 4 is a flow chart in accordance with one embodiment.

The block diagram and the flow chart of the histogram segmentation based adaptive Wiener filtering are shown in FIGS. 3 and 4, respectively. The adaptive Wiener filtering decision process is as follows.

The global Wiener filter coefficients are trained, as indicated in FIG. 4, block 70, and FIG. 3, block 60 and a picture is filtered with the global filter (FIG. 4, block 72). The RD cost of global Wiener filtering (FIG. 3, line 60a) is calculated (FIG. 4, block 74) as is the RD cost of no filtering (FIG. 3, line 60b).

The available histogram segmentation methods 62, 64, 66 in FIG. 3 are looped over (FIG. 4, block 76). The final RD cost is obtained for each method and provided to RDO based filtering mode decision unit 68 in FIG. 3. The filtering flag of each bin is set according to the global Wiener filter (FIG. 4, block 78), and then the RD cost is calculated using equation (4) (block 80, FIG. 4). The filter coefficients are retrained with the bins whose filtering flags equal 1 (FIG. 4, block 82), and then the picture is filtered with the new filter coefficients (FIG. 4, block 84). The filtering flag of each bin is reset according to the new Wiener filter (block 86), and then the new RD cost is calculated using equation (4) (block 88). If the maximum iteration time is not reached (diamond 90, NO), the flow goes back to block 82.

Otherwise (diamond 90 YES), the complementary filter is trained with the bins whose filtering flags equal to 0, and then a decision is made to use or not use the complementary filter, based on RDO criterion (block 92). The final RD cost of the current histogram segmentation mode is calculated (block 94). The RD costs of all the coding modes, i.e., no filtering, global filtering and the available histogram segmentation based filtering, are compared (diamond 96) and the one with the minimum RD cost for coding the picture is selected in one embodiment (block 98).

Figure 5:
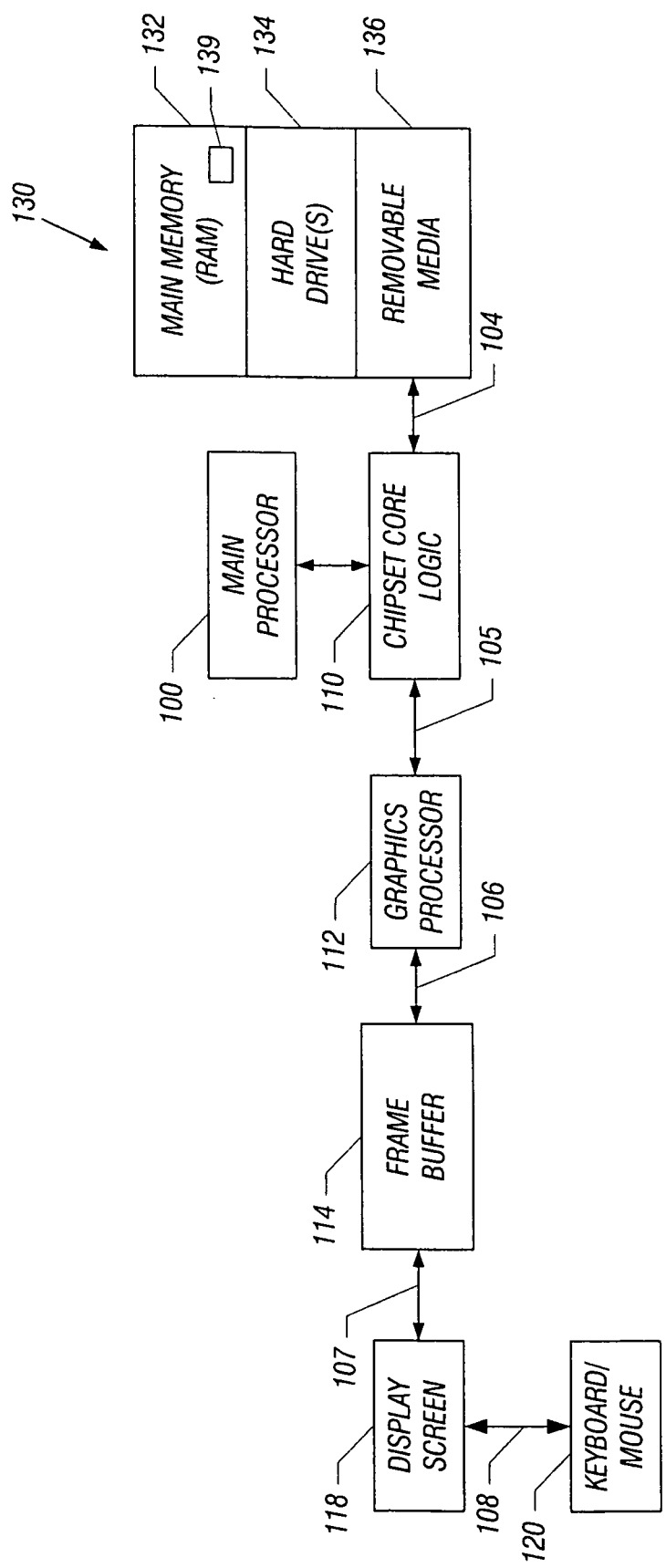
FIG. 5 is a system depiction for one embodiment.

Referring to FIG. 5, the encoder and decoder depicted in FIGS. 1 and 2 may, in one embodiment, be part of a graphics processor 112. In some embodiments, the encoder and decoder shown in FIGS. 1 and 2 may be implemented in hardware and, in other embodiments, they may be implemented in software or firmware. In the case of a software implementation, the pertinent code may be stored in any suitable semiconductor, magnetic or optical memory, including the main memory 132. Thus, in one embodiment, source code 139 may be stored in a computer readable medium, such as main memory 132, for execution by a processor, such as the processor 100 or the graphics processor 112.

A computer system 130 may include a hard drive 134 and a removable medium 136, coupled by a bus 104 to a chipset core logic 110. The core logic may couple to the graphics processor 112 (via bus 105) and the main processor 100 in one embodiment. The graphics processor 112 may also be coupled by a bus 106 to a frame buffer 114. The frame buffer 114 may be coupled by a bus 107 to a display screen 118, in turn coupled to conventional components by a bus 108, such as a keyboard or mouse 120.

The blocks indicated in FIGS. 1 and 2 may constitute hardware or software components. In the case of software components, the figures may indicate a sequence of instructions that may be stored in a computer readable medium such as a semiconductor integrated circuit memory, an optical storage device, or a magnetic storage device. In such case, the instructions are executable by a computer or processor-based system that retrieves the instructions from the storage and executes them. In some cases, the instructions may be firmware, which may be stored in an appropriate storage medium. One result of the execution of such instructions is the improvement of quality of pictures that are ultimately displayed on a display screen.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

filtering an entire picture;

analyzing filter distortion of a plurality of pixels of said picture;

binning said pixels based on filter distortion such that each of at least two bins is associated with a different distortion;

selecting a different filter for each bin, each filter adapted to the distortion associated with a particular bin and, further, each filter selected based at least in part on the cost of the filter in terms of the number of bits used by a filter coefficient;

determining the rate distortion costs of no filtering, global filtering, and histogram segmentation based filtering and selecting the one with the least rate distortion cost;

evaluating the efficiency of run length, quad tree and an arithmetic coding; and selectively applying one of run length, quad tree and arithmetic coding based on said evaluation to a filtering flag.

2. The method of claim 1 including selecting a Wiener filter and applying Wiener filter iterative retraining on the particular bin.

3. The method of claim 2 including adaptively selecting between global Wiener filtering or histogram-segmentation based local Wiener filtering.

4. The method of claim 2 including applying a complementary Wiener filter on unselected bins.

5. The method of claim 3 including applying entropy coding on a filtering flag of a bin when histogram-segmentation based local Wiener filter is used.

6. An apparatus comprising:

a video coding pipeline to code a video picture by categorizing pixels, said pipeline to filter an entire picture, analyze filter distortion of a plurality of pixels of said picture, bin said pixels based on filter distortion using a first criterion such that each bin is associated with a distortion, bin said pixels based on filter distortion using a second criterion such that each bin is associated with a distortion, select one of said first or second criterion to bin said pixels based on distortion, select a different filter, adapted to a distortion associated with a particular bin based at least in part on the cost of the filter in terms of the number of bits used by a filter coefficient for each of at least two bins, and determine the rate distortion costs of no filtering, global filtering, and histogram segmentation based filtering and select the one with the least rate distortion cost, evaluate the efficiency of run length, quad tree and an arithmetic coding, and selectively apply one of run length, quad tree and arithmetic coding based on said evaluation to a filtering flag; and an adaptive Wiener filter to selectively filter said pixels.

7. The apparatus of claim 6, said Wiener filter to adaptively filter based on segmented histogram bins depending on Rate Distortion Optimization (RDO) criterion.

8. The apparatus of claim 7, said Wiener filter to apply multiple histogram segmentation schemes and then to select a segmentation scheme based on the RDO criterion.

9. The apparatus of claim 8, said Wiener filter to iteratively retrain on the histogram bin selected for filtering by the RDO criterion.

10. The apparatus of claim 7 including a complementary Wiener filter applied to unselected histogram bins.

11. The apparatus of claim 10, said complementary Wiener filter to adaptively filter based on RDO criterion.

12. The apparatus of claim 6 including an entropy encoder to entropy encode a filtering flag of a histogram bin when the histogram-segmentation based local Wiener filter is used.

13. The apparatus of claim 12 including said pipeline to apply different entropy coding modes for the bin filtering flags and to find the mode with the best coding efficiency to encode the flags.

14. The apparatus of claim 13 including a decoder to use a Wiener filter coefficient selected using histogram segmentation.

* * * * *